L. A. C. Brown,
Horse Rake.

No. 18731

Patented Dec. 1, 1857.

UNITED STATES PATENT OFFICE.

L. A. C. BROWN, OF SPARTA, ILLINOIS.

IMPROVEMENT IN HAY-RAKES.

Specification forming part of Letters Patent No. 18,731, dated December 1, 1857.

*To all whom it may concern:*

Be it known that I, L. A. C. BROWN, of Sparta, in the county of Randolph and State of Illinois, have invented a new and useful Improvement in Hay-Rakes for Raking Hay; and I do hereby declare that the following is a full, clear, and exact description of the same, reference being had to the annexed drawings, making a part of this specification, in which—

Figure 1:
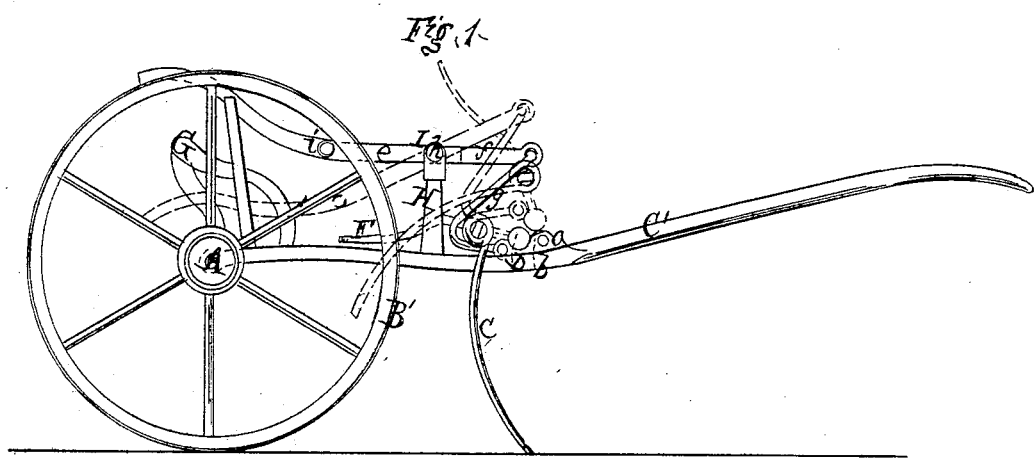
Figure 2:
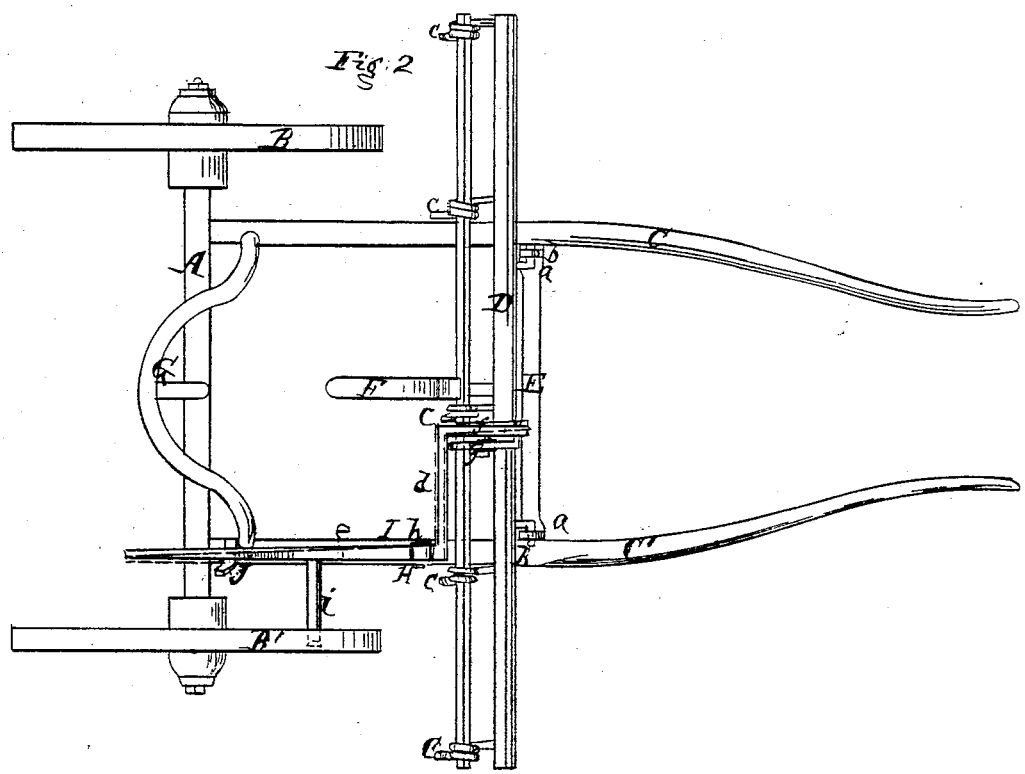

Figure 1 is a side view of my improvement. Fig. 2 is a plan or top view of the same.

Similar letters of reference indicate corresponding parts in the two figures.

This invention consists in a novel arrangement of the rake-head, whereby the same may be elevated at proper intervals to discharge its load through the agency of one of the wheels of the machine, as hereinafter shown.

To enable those skilled in the art to fully understand and construct my invention, I will proceed to describe it.

A is an axle, and B B' are wheels placed loosely on it—one at each end.

C C' are thills, which are attached to the axle A.

D is a bar, which is provided with two hooks, *a a*, said hooks fitting in eyes *b b*, which are attached to a cross-piece, E, of the thills C C'. The hooks *a a* are allowed to turn freely in the eyes *b b*, and to the bar D rake-teeth *c* are attached. These teeth may be constructed of wire, coiled at their ends, as usual; or other form of teeth may be used.

The rake, so far as its particular construction is considered, does not differ materially from others in general use.

F is a lever which is attached to the bar D, said lever projecting backward in front of the driver's seat.

To the right-hand thill C', and just back of the bar D, an upright, H, is attached, and a lever, I, is fitted in the upper end of said upright. The lever I is of bent form, the part *a* being at right angles with the front *e*. The part *d* is also bent, forming a part, *f*, which is parallel with the part *e*, and is connected to the bar D by a link, *g*. The part *e* is fitted on a pivot, *h*, in the upper end of upright H, and the lever is allowed a certain degree of lateral play on said pivot, the hole through which the pivot passes being sufficiently large for this purpose.

To the outer side of the part *e* of the lever F a pin, *i*, is attached, said pin projecting at right angles from the part *e*.

The operation is as follows: As the implement is drawn along the foot of the driver is placed upon the lever F, and the teeth *c* of the rake consequently kept down, so that their lower ends will be upon the ground, the hay, as the machine moves, collecting in the hollow of the teeth. The position of the rake when at work is shown in black. (See more particularly Fig. 1.) When the rake is full the driver removes his foot from the lever F and moves the outer end of the part *e* of the lever I toward the wheel B', and a spoke of said wheel will strike the pin *i*, and thereby elevate the inner parts, *d f*, of lever I, and also the rake-teeth *c*, the hooks *a* being allowed to turn in the eyes *b*. (See red lines, Fig. 1.) As the teeth *c* are elevated they of course pass over their load, or over the hay raked up by them, the hay being left in an oblong pile or row, as usual. When the teeth *c* are fully elevated the pin *i* is moved free from the spokes of the wheel B' in consequence of the outer end of the part *e* of the lever I bearing against an inclined bar, *j*, attached to the thill C' near its junction with the axle A. This will be understood by referring to Fig. 2. The rake-teeth are then made to descend in consequence of the driver slightly elevating the outer end of lever I, or by placing his foot on lever F, which, when slightly moved, will turn the rake so that it will fall or descend by its own gravity.

I do not claim broadly a rake so arranged as to swing and allow its teeth to be elevated that it may deliver its load, for rakes thus arranged have been previously used; but,

Having thus described my invention, what I do claim as new, and desire to secure by Letters Patent, is—

Operating or raising the rake through the medium of the lever I, provided with the pin *i*, the wheel B', and the curved bar *j*, arranged substantially as described.

L. A. C. BROWN.

Witnesses:
J. C. BATES,
ADAM GILLIBRAND.